United States Patent
Tanjo et al.

(10) Patent No.: US 10,020,489 B2
(45) Date of Patent: Jul. 10, 2018

(54) LITHIUM-ION SECONDARY CELL

(71) Applicant: Automotive Energy Supply Corporation, Zama-shi, Kanagawa (JP)

(72) Inventors: Yuji Tanjo, Yokohama (JP); Yukinori Takahashi, Hitachinaka (JP); Yoshihiro Niida, Sagamihara (JP)

(73) Assignee: AUTOMOTIVE ENERGY SUPPLY CORPORATION, Zama-shi (JP)

( * ) Notice: Subject to any disclaimer, the term of this patent is extended or adjusted under 35 U.S.C. 154(b) by 457 days.

(21) Appl. No.: 14/387,780

(22) PCT Filed: Mar. 14, 2013

(86) PCT No.: PCT/JP2013/057127
§ 371 (c)(1),
(2) Date: Sep. 24, 2014

(87) PCT Pub. No.: WO2013/146285
PCT Pub. Date: Oct. 3, 2013

(65) Prior Publication Data
US 2015/0044567 A1    Feb. 12, 2015

(30) Foreign Application Priority Data
Mar. 26, 2012   (JP) .................. 2012-069333

(51) Int. Cl.
*H01M 4/131* (2010.01)
*H01M 4/62* (2006.01)
(Continued)

(52) U.S. Cl.
CPC .......... *H01M 4/131* (2013.01); *H01M 4/133* (2013.01); *H01M 4/366* (2013.01); *H01M 4/505* (2013.01);
(Continued)

(58) Field of Classification Search
CPC .. H01M 10/0525; H01M 4/131; H01M 4/505; H01M 5/525; H01M 4/13; H01M 4/1391; H01M 4/62
See application file for complete search history.

(56) References Cited

U.S. PATENT DOCUMENTS 7,179,565 B2    2/2007  Okochi et al.
2003/0068555 A1    4/2003  Naruoka
(Continued)

FOREIGN PATENT DOCUMENTS

CN    1280939 C    10/2006
JP    2002-319390 A    10/2002
(Continued)

OTHER PUBLICATIONS

Chinese Office Action, dated Oct. 28, 2016, 4 pages.

*Primary Examiner* — Karie O'Neill Apicella
(74) *Attorney, Agent, or Firm* — Foley & Lardner LLP

(57) ABSTRACT

A lithium-ion secondary cell according to the present invention is provided with a positive electrode and a negative electrode. The positive electrode contains a lithium-manganese composite oxide partially substituted by magnesium as a positive electrode active material. The negative electrode contains a graphite coated with amorphous carbon as a negative electrode active material, a carbon black-based conductive aid and a fluororesin-based binding agent.

5 Claims, 3 Drawing Sheets

(51) Int. Cl.
*H01M 4/13* (2010.01)
*H01M 10/0525* (2010.01)
*H01M 4/505* (2010.01)
*H01M 4/525* (2010.01)
*H01M 4/587* (2010.01)
*H01M 4/36* (2006.01)
*H01M 4/133* (2010.01)
*H01M 4/02* (2006.01)

(52) U.S. Cl.
CPC ........... *H01M 4/525* (2013.01); *H01M 4/587* (2013.01); *H01M 4/625* (2013.01); *H01M 10/0525* (2013.01); *H01M 4/623* (2013.01); *H01M 2004/021* (2013.01); *H01M 2004/028* (2013.01); *H01M 2220/20* (2013.01); *Y02T 10/7011* (2013.01)

(56) References Cited

U.S. PATENT DOCUMENTS

| | | |
|---|---|---|
| 2004/0048158 A1 | 3/2004 | Okochi et al. |
| 2004/0185330 A1* | 9/2004 | Yamaguchi ......... H01M 2/0275 429/59 |
| 2008/0145761 A1* | 6/2008 | Petrat ...................... C23C 16/24 429/231.8 |
| 2013/0011747 A1* | 1/2013 | Sasaki .................... C01B 31/02 429/336 |
| 2013/0216920 A1 | 8/2013 | Tsujikawa et al. |

FOREIGN PATENT DOCUMENTS

| | | | | |
|---|---|---|---|---|
| JP | 2003-282140 A | 10/2003 | | |
| JP | 2011-023221 A | 2/2011 | | |
| JP | 2011-076997 A | 4/2011 | | |
| JP | 2012-059389 A | 3/2012 | | |
| JP | 2012059389 A | * | 3/2012 | ........ H01M 10/0525 |
| WO | WO 03/049216 A1 | 6/2003 | | |

* cited by examiner

LITHIUM-ION SECONDARY CELL

FIELD OF THE INVENTION

The present invention relates to a lithium-ion secondary cell.

BACKGROUND ART

In recent years, the reduction of carbon dioxide emissions has been sincerely desired in order to address air pollution and global warming. The automotive industry has a growing expectation on the introduction of electric vehicles (EV) and hybrid electric vehicles (HEV) for the reduction of carbon dioxide emissions and has been intensively working on the development of motor-drive secondary cells, which become key to the practical application of these electric vehicles.

As the motor-drive secondary cells, attentions are being given to lithium-ion secondary cells of relatively high theoretical energy. The development of the lithium-ion secondary cells has been rapidly pursued at present. In general, the lithium-ion secondary cell includes a positive electrode, a negative electrode, a separator and electrolyte arranged between the positive and negative electrodes and an outer casing member accommodating therein the positive and negative electrodes, separator and electrolyte. In the lithium-ion secondary cell, for example, lithium cobaltate ($LiCoO_2$) or lithium manganate ($LiMn_2O_4$) is applied as a main material of the positive electrode; and graphite is applied as a main material of the negative electrode. Further, a porous polyolefin etc. is used for the separator; lithium hexafluorophosphate is used as the electrolyte; and a laminate film etc. is used for the outer casing member in the lithium-ion secondary cell.

There has conventionally been proposed a non-aqueous secondary cell using a lithium-manganese composite oxide represented by $Li_xMn_{2-y}MA_yO_{4+z}$ (where MA is at least one kind of element selected from the group consisting of Mg, Al, Cr, Fe, Co and Ni; $1<x\leq1.2$; $0<y\leq0.1$; and $-0.3\leq z\leq0.3$) as a positive electrode active material so as to prevent the elution of manganese from the lithium-manganese composite oxide active material.

It is an essential condition for this non-aqueous secondary cell to use, as a negative electrode active material, a mixture of a carbon material powder in which high-crystalline carbon particles are coated with low-crystalline carbon in the form of a mixture with non-carbon-coated, graphitized meso-carbon microbeads since there is a need to add a large amount (e.g. 10% by weight or more) of binder into the negative electrode due to the bulkiness of the carbon material powder (see Patent Document 1).

The present inventors have however obtained, as a result of research, a new technical finding that the lithium-ion secondary cell increases in resistance in the case of using the lithium-manganese composite oxide partially substituted by magnesium as the positive electrode active material and the mixture of the non-carbon-coated graphite and the carbon-coated graphite as the negative electrode active material.

The present inventors have made further research on such a finding and resultingly found that, although the negative electrode has exposed parts between crystalline layers of the non-carbon-coated graphite (as inlet and outlet for the transfer of lithium ions), these exposed parts are readily clogged by magnesium deposition during long-term use so that the non-carbon-coated graphite becomes deactivated in advance so as to develop nonuniformity of stress in the negative electrode active material layer due to difference in expansion/contraction rate between particles of the coated graphite and non-coated graphite by charge and discharge operation and make it likely that the adhesion of the particles will be broken to cause increase in cell resistance.

The present invention has been established based on these new technical findings. It is an object of the present invention to provide a lithium-ion secondary cell capable of preventing increase in resistance.

PRIOR ART DOCUMENTS

Patent Document

Patent Document 1: Japanese Laid-Open Patent Publication No. 2003-282140

SUMMARY OF THE INVENTION

As a result of extensive research, the present inventors have found that the above object can be achieved by providing a lithium-ion secondary cell with a positive electrode containing a lithium-manganese composite oxide partially substituted by magnesium as a positive electrode active material and a negative electrode containing a graphite coated with amorphous carbon as a negative electrode active material, a carbon black-based conductive aid a fluororesin-based binding agent, and then, completed the present invention.

It is possible according to the present invention to prevent resistance increase in the lithium-ion secondary cell.

DESCRIPTION OF EMBODIMENTS

Hereinafter, a lithium-ion secondary cell according to the present invention will be described in detail.

The lithium-ion secondary cell of the present invention has a positive electrode and a negative electrode. In the lithium-ion secondary cell of the present invention, the positive electrode contains a lithium-manganese composite oxide partially substituted by magnesium as a positive electrode active material. Further, the negative electrode contains a graphite coated with amorphous carbon as a negative electrode active material, a carbon black-based conductive aid and a fluororesin-based binding agent in the lithium-ion secondary cell of the present invention.

In such a configuration, it is possible to prevent resistance increase in the lithium-ion secondary cell. The reason for this has not yet been fully clarified but may be assumed as follows. When the graphite coated with amorphous carbon is used as the negative electrode active material, magnesium can be captured (trapped) onto a surface of the amorphous carbon, which has almost no contribution to negative electrode capacity, so as to suppress inhibition of lithium ion transfer between graphite crystalline layers (i.e. suppress formation of lithium-resistant film) and prevent increase in resistance. When the fluororesin-based binding agent is added together with the carbon black-based conducive aid to the negative electrode active material in such an amount as to cover at least part of particles of the negative electrode material with the fluororesin-based binding agent while allowing the carbon black-based conducive aid to be dispersed in the fluororesin-based binding agent, magnesium can be captured (trapped) onto the carbon black-based conductive aid in the film of the fluororesin-based binding agent, which is permeable to non-aqueous electrolyte, so as to reduce the amount of magnesium reaching contact points between the particles of the negative electrode active material and prevent increase in resistance due to magnesium deposition.

Figure 1:
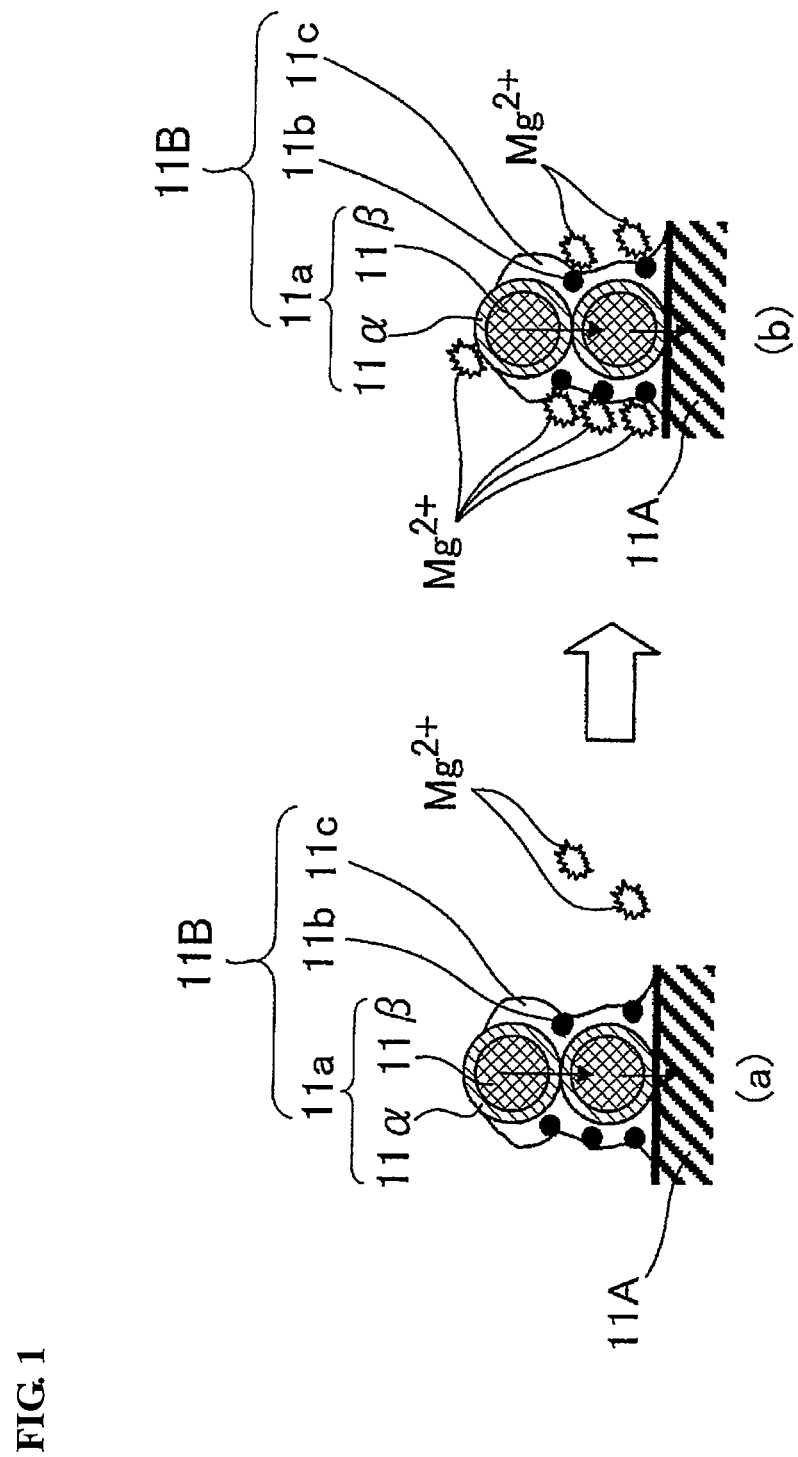
FIGS. 1(a) and (b) are schematic views showing how to trap (adsorb) magnesium by a negative electrode of a lithium-ion secondary cell according to the present invention.

FIGS. 1(a) and (b) are schematic views showing how to capture (adsorb) magnesium on the negative electrode in the lithium-ion secondary cell of the present invention. In FIGS. 1(a) and (b), downward arrows indicate the flow of electrons.

As shown in FIG. 1(a), the negative electrode has a negative electrode collector 11A and a negative electrode active material layer 11B formed on the negative electrode collector 11A and containing a graphite 11β coated with amorphous carbon 11α as a negative electrode active material 11a, a carbon black-based conductive aid 11b and a fluororesin-based binding agent 11c. At least part of particles of the negative electrode active material 11a is covered with the fluororesin-based binding agent 11c in which the black-based conductive aid 11b is dispersed, such that the fluororesin-based binding agent 11c provides bonding between the particles of the negative electrode active material 11a and between the negative electrode active material 11a and the negative electrode collector 11A. Herein, magnesium ions ($Mg^{2+}$) are eluted from the not-illustrated positive electrode.

The magnesium ions ($Mg^{2+}$) are captured (trapped) onto a surface of the amorphous carbon 11α, which has almost no contribution to negative electrode capacity, and onto the carbon black-based conductive aid 11b as shown in FIG. 1(b). This makes it reduce the amount of magnesium reaching contact points between the particles of the negative electrode active material, suppress inhibition of the flow of electrons at these contact points and thereby prevent increase in the resistance of the lithium-ion secondary cell even during long-term use.

Although not shown in the drawings, it is assumed that, in the case of using the amorphous carbon-coated graphite in combination with a non-coated graphite as the negative electrode active material, the lithium-ion secondary cell cannot be prevented from resistance increase because the non-coated graphite becomes deactivated in advance by magnesium deposition so as to develop nonuniformity of stress in the negative electrode active material layer due to difference in expansion/contraction rate between particles of the coated graphite and non-coated graphite by charge and discharge operation and make it likely that the adhesion of the particles will be broken to increase the spacing between the particles and inhibit the flow of electrons.

It is also assumed that, in the case of using no carbon black-based conductive aid, the lithium-ion secondary cell results in resistance increase because the electron conduction path for electrons is formed only through the contact points between the particles of the negative electrode active material and is likely to be influenced by magnesium deposition although not shown in the drawings.

A lithium-ion secondary cell according to one embodiment of the present invention will be described below with reference to the drawings. It is herein noted that, in the drawings, the dimensions of the respective parts and portions may be exaggerated for purposes of illustration and may be different from the actual dimensions.

[Structure of Lithium-Ion Secondary Cell]

Figure 2:
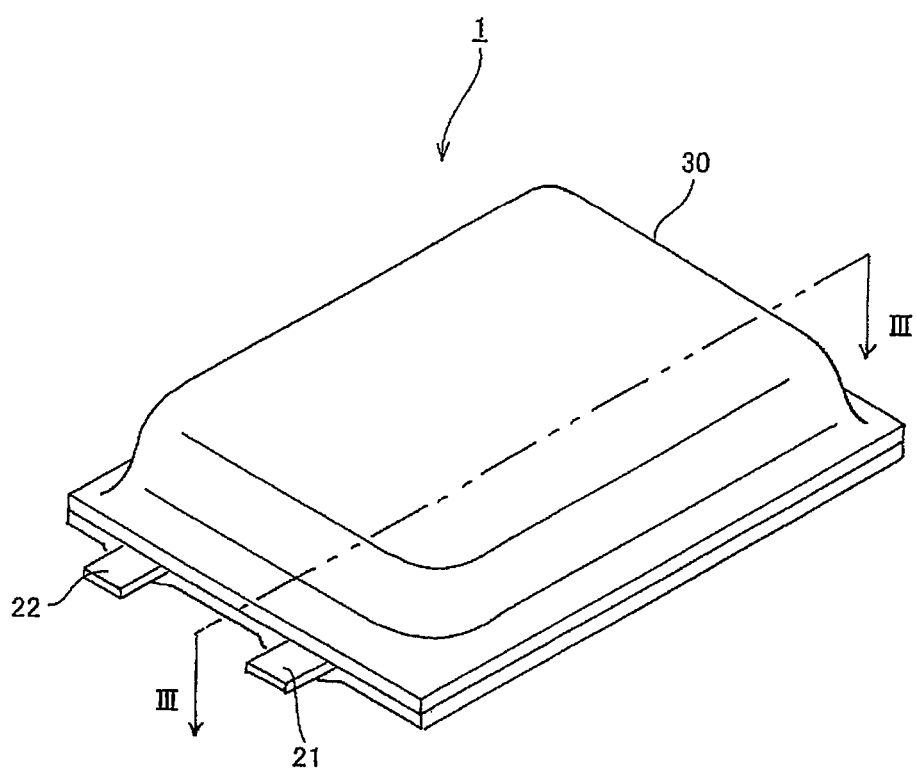
FIG. 2 is a schematic perspective view of the lithium-ion secondary cell according to one embodiment of the present invention.
Figure 3:
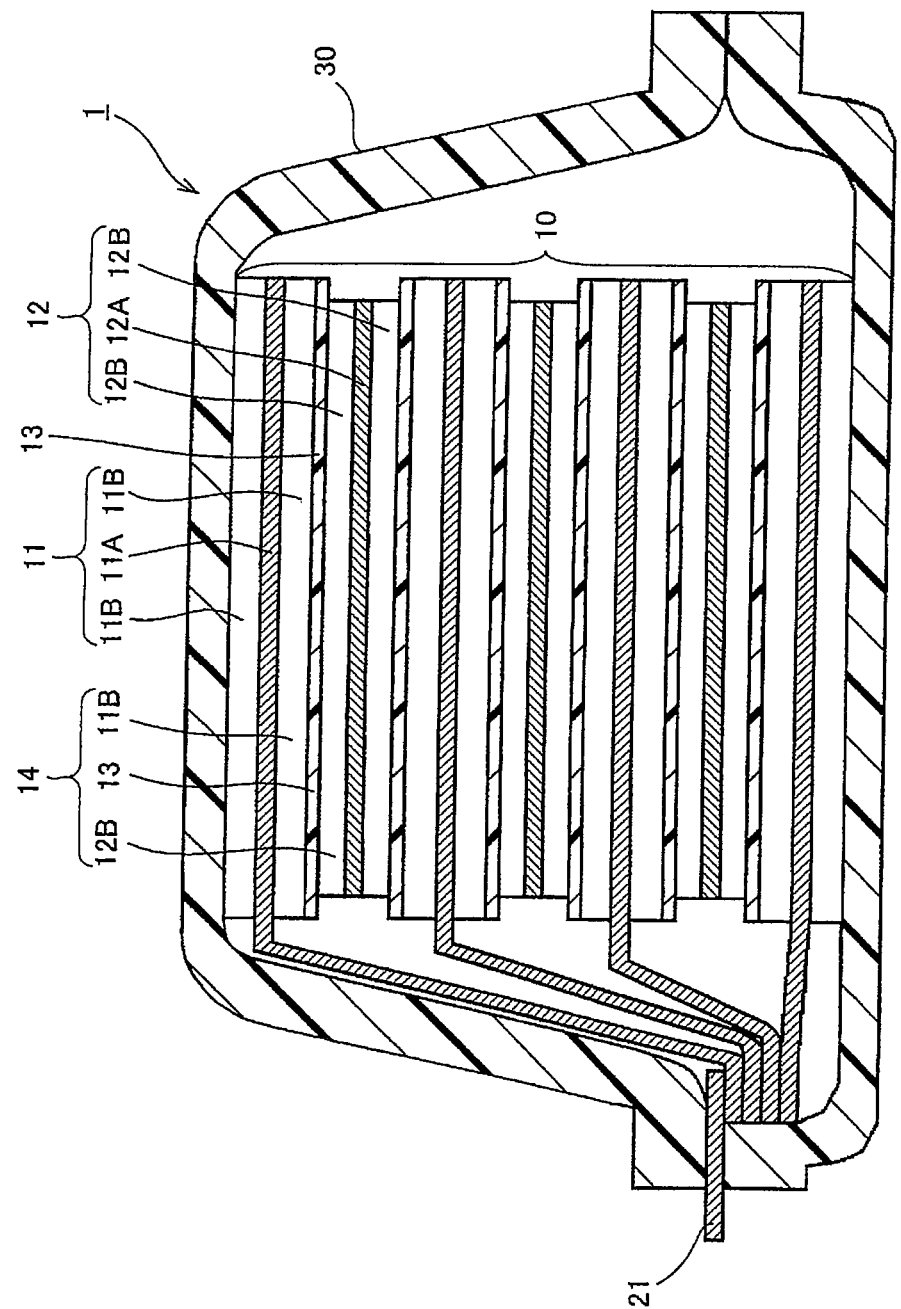
FIG. 3 is a schematic cross-section view of the lithium-ion secondary cell taken along line of FIG. 2.

FIG. 2 is a schematic perspective view of the lithium-ion secondary cell according to one embodiment of the present invention. FIG. 3 is a schematic cross-section view of the lithium-ion secondary cell taken along line of FIG. 2. The lithium-ion secondary cell is herein configured as a so-called laminate-type secondary cell.

As shown in FIGS. 2 and 3, the lithium-ion secondary cell 1 of the present embodiment has a cell element 10 equipped with a negative electrode terminal 21 and a positive electrode terminal 22 and sealed in an outer casing member 30. In the present embodiment, the negative electrode terminal 21 and the positive electrode terminal 22 are led out in one direction from the inside to the outside of the outer casing member 30. Although not shown in the drawings, the negative and positive electrode terminals may alternatively be led out in opposite directions from the inside to the outside of the outer casing member. It is feasible to join the negative and positive electrode terminals to the after-mentioned negative and positive electrode collectors by ultrasonic welding, resistance welding or the like.

[Negative Electrode Terminal and Positive Electrode Terminal]

Each of the negative electrode terminal 21 and the positive electrode terminal 22 is made of e.g. aluminum, copper, titanium, nickel, stainless steel (SUS) or any alloy thereof. The materials of the negative electrode terminal 21 and the positive electrode terminal 22 are however not limited to these materials. It is feasible to use any of conventionally known terminal materials for lithium-ion secondary cells. Further, the negative electrode terminal and the positive electrode terminal can be of the same material or of different materials. Although these negative and positive electrode terminals are produced separately and joined to the negative and positive electrode collectors in the present embodiment, portions of the negative and positive electrode collectors may be extended and used as the negative and positive electrode terminals.

[Exterior Casing Member]

The outer casing member 30 is preferably a laminate package made of e.g. a flexible film in which a synthetic resin and a metal foil are laminated together for reduction in weight and improvement in cell energy density. The laminate-type secondary cell shows good heat radiation performance and thus can suitably be used as batteries for electric vehicles etc.

[Cell Element]

As shown in FIG. 3, the cell element 10 has a plurality of negative electrodes 11, non-aqueous electrolyte layers 13 and positive electrodes 12 alternately laminated together in the present embodiment. Each of the negative electrodes 11 has a negative electrode collector 11A and negative electrode active material layers 11B formed on main surfaces of the negative electrode collector 11A and containing a negative electrode active material capable of absorbing and desorbing lithium ions, whereas each of the positive electrodes 12 has a positive electrode collector 12A and positive electrode active material layers 12B formed on main surfaces of the positive electrode collector 12A and containing a positive electrode active material capable of absorbing and desorbing lithium ions. The negative electrode, the non-aqueous electrolyte layer and the positive electrode are laminated in this order in plural numbers.

At this time, the adjacent negative electrode active material layer 11B, non-aqueous electrolyte layer 13 and positive electrode active material layer 12B function together as a single unit cell layer 14. In other words, the lithium-ion secondary cell 1 has a plurality of unit cell layers 14 laminated together and electrically connected in parallel. An insulating layer (not illustrated) may be arranged on an outer circumference of the unit cell layer so as to keep the adjacent negative and positive electrode collectors insulated from each other.

[Negative Electrode]

In the negative electrode 11, the negative electrode active material layers 11B are formed on both of the main surfaces of the negative electrode collector 11A. The negative electrode active material layer contains, in addition to the negative electrode active material, a conductive aid and a binding agent. As the active material, the conductive aid and the binding agent are processed into a slurry by mixing and stirring as will be explained later, it is assumed that the conductive aid is contained in the state of being dispersed in the binding agent. It is further assumed that at least part of particles of the negative electrode active material is covered by the binding agent and thereby bonded together by the binding agent when the content amount of the binding agent in the negative electrode is controlled to within a predetermined preferable range.

(Negative Electrode Collector)

The negative electrode collector is made of e.g. copper, stainless steel (SUS), nickel, titanium or any alloy thereof.

(Negative Electrode Active Material)

The negative electrode active material includes a graphite coated with amorphous carbon. Preferably, the graphite coated with amorphous carbon has an average particle size of e.g. several μm to several tens μm. Further, the graphite coated with the amorphous carbon preferably has a BET specific surface area of e.g. $10^{-1}$ to $10$ $m^2/g$.

(Conductive Aid)

As the conductive aid, a carbon black-based conductive aid is used. Preferably, the carbon black-based conductive aid has a BET specific surface area of e.g. 10 to $10^2$ $m^2/g$. When the BET specific surface area of the conductive aid is in the above range, the conductive aid can exert a sufficient magnesium trapping (adsorbing) function. In addition, the BET specific surface area of the conductive aid is preferably larger than the BET specific surface area of the negative electrode active material such that the conductive aid can be present closer to the contact points between the particles of the negative electrode active material. The carbon black-based conductive aid can be ketjen black, acetylene black, channel black, lamp black, oil furnace black, thermal black or a mixture of any combination thereof.

(Binding Agent)

As the binding agent (binder), a fluororesin-based binding agent is used. The fluororesin-based binding agent can be polyvinylidene fluoride (PVdF) or a vinylidene fluoride copolymer obtained by copolymerization of vinylidene fluoride and another fluoro monomer or monomers. In the present invention, the fluororesin-based binding agent is not limited to those consisting of a fluororesin or fluororesins as long as the after-mentioned non-aqueous electrolyte is capable of penetrating into the fluororesin-based binding agent. In the case of using an acrylic resin-based binding agent having higher adhesion than the fluororesin-based binding agent, by contrast, the conductive aid becomes covered by a film of the acrylic resin-based binding agent into which the non-aqueous electrolyte cannot penetrate so that, even by the use of the carbon black-based conductive aid in the negative electrode, the desired magnesium trapping (adsorbing) effects of the carbon black-based conductive aid cannot be obtained in the present invention.

[Positive Electrode]

In the positive electrode 12, the positive electrode active material layers 12B are formed on both of the main surfaces of the positive electrode collector 12A. The positive electrode active material layer contains, in addition to the positive electrode active material, a conductive aid and a binding agent as needed. It is feasible in the positive electrode to appropriately select and use any conventional conductive aid and binding agent for lithium-ion secondary cells.

(Positive Electrode Collector)

The positive electrode collector is made of e.g. aluminum, stainless steel (SUS), nickel, titanium or any alloy thereof.

(Positive Electrode Active Material)

The positive electrode active material contains a lithium-manganese composite oxide partially substituted by magnesium, and more specifically, a lithium-manganese composite oxide in which part of manganese sites are substituted by magnesium or by magnesium and any other element or elements. Examples of such a lithium-manganese composite oxide are those represented by $LiMn_{2-x-y}Mg_xMA_yO_{4+z}$ (where MA is at least one kind of transition metal element other than Mn, and/or Li; and x, y and z satisfy the conditions of $0<x<2$, $0\leq y<1$ and $-0.5<z<0.5$) and those represented by $LiMn_{1-x-y}Mg_xMB_yO_{2+z}$ (where Mg is at least one kind of transition metal element other than Mn, and/or Li; and x, y and z satisfy the conditions of $0<x<1$, $0\leq y<1$ and $-0.5<z<0.5$). Among others, the oxide compound $LiMn_{2-x-y}Mg_xMA_yO_{4+z}$ of spinel structure is preferred for its higher effectiveness. It is feasible to use a positive electrode active material mixture in which a powder of the lithium-manganese composite oxide partially substituted by magnesium is contained in an amount of 50% or more in combination of a powder of lithium-nickel composite oxide.

[Non-Aqueous Electrolyte Layer]

The non-aqueous electrolyte layer 13 is formed into a layer structure by, for example, retaining a non-aqueous electrolyte in a separator as will be explained later or using a polymer gel electrolyte. As the non-aqueous electrolyte, there can be used a solution of a support salt (lithium salt) in a non-aqueous solvent.

(Lithium Salt)

Examples of the Lithium Salt are Lithium Imide Salts, Lithium hexafluorophosphate ($LiPF_6$), lithium hexafluoroarsenate ($LiAsF_6$), lithium aluminum tetrachloride ($LiAlCl_4$), lithium perchlorate ($LiClO_4$), lithium tetrafluoroboronate ($LiBF_4$) and lithium hexafluoroantimonate ($LiSbF_6$). Among others, lithium hexafluorophosphate ($LiPF_6$) or lithium tetrafluoroboronate ($LiBF_4$) is particularl preferred. Examples of the lithium imide salt are those represented by $LiN(C_kF_{2k+1}SO_2)(C_mF_{2m+1}SO_2)$ (where k and m are each independently 1 or 2). These lithium salts can be used solely or in combination of two or more kinds thereof.

(Non-Aqueous Solvent)

The non-aqueous solvent can be at least one kind of organic solvent selected from the group consisting of cyclic carbonates, chain carbonates, aliphatic carboxylates, γ-lactones, cyclic ethers, chain ethers and fluorinated derivatives thereof. Examples of the cyclic carbonate are propylene carbonate (PC), ethylene carbonate (EC), butylene carbonate (BC) or fluorinated derivatives thereof. Examples of the chain carbonate are dimethyl carbonate (DMC), diethyl carbonate (DEC), ethyl methyl carbonate (EMC), dipropyl carbonate (DPC) and fluorinated derivatives thereof.

Examples of the aliphatic carbonate are methyl formate, methyl acetate, ethyl propionate and fluorinated derivatives thereof. Examples of the γ-lactone are γ-butyrolactone or fluorinated derivatives thereof. Examples of the cyclic ether are tetrahydrofuran and 2-methyltetrahydrofuran. Examples of the chain ether are 1,2-ethoxyethane (DEE), ethoxymethoxyethane (DEE), diethyl ether and fluorinated derivatives thereof. Any other solvent, such as dimethyl sulfoxide, 1,3-dioxolane, formaldehyde, acetamide, dimethylformamide, dioxolane, acetonitrile, propionitrile, nitromethane, ethylmonoglyme, phosphoric acid triester, trimethoxymethane, dioxolane derivative, sulfolane, methylsulfolane, 1,3-dimethyl-2-yl ether, 1,3-propane sultone, anisole, N-methylpyrrolidone or fluorinated carboxylate, is also usable. These solvents can be used solely or in combination of two or more kinds thereof.

(Separator)

The separator can be, for example, a porous film of polyolefin such as polyethylene (PE) or polypropylene (PP) or fluororesin such as polyvinylidene fluoride (PVdF) or polytetrafluoroethylene (PTFE). In the case of retaining the non-aqueous electrolyte in polyvinylidene fluoride, the polyvinylidene fluoride may form a polymer gel electrolyte.

[Production Method of Lithium-Ion Secondary Cell]

One example of production method of the lithium-ion secondary cell according to the above embodiment will be explained below.

Negative electrode are each formed by dispersing the graphite coated with amorphous carbon as the negative electrode active material, the carbon black-based conductive aid and the fluororesin-based binding agent at a predetermined content ratio in a solvent such as N-methyl-2-pyrrolidone (NMP), applying the resulting slurry to the negative electrode collector such as copper foil collector, drying the applied slurry and thereby forming the negative electrode active material layers. Each of the formed negative electrodes may be subjected to compression by roll pressing etc. in order to adjust the density of the negative electrode as appropriate.

On the other hand, positive electrodes are each formed by dispersing the lithium-manganese composite oxide substituted by magnesium as the positive electrode active material, the conductive aid and the binding agent at a predetermined content ratio in a solvent such as N-methyl-2-pyrrolidone (NMP), applying the resulting slurry to the positive electrode collector such as aluminum foil collector with the use of a doctor blade on a hot plate etc., drying the applied slurry and thereby forming the positive electrode active material layers. Each of the formed positive electrodes may be subjected to compression by roll pressing etc. in order to adjust the density of the positive electrode as appropriate.

Subsequently, the positive electrodes, the separators and the negative electrodes are alternately laminated together. The negative electrode terminal is joined to the negative electrodes. Further, the positive electrode terminal is joined to the positive electrodes. The thus-obtained laminate is sandwiched between polymer-metal composite laminate film sheets. The laminate film sheets are formed into a bag-shaped outer casing member by thermally bonding outer circumferential sides, except one side, of the laminate film sheets.

After that, the non-aqueous electrolyte is prepared by dissolving the lithium salt such as lithium hexafluorophosphate in the organic solvent such as ethylene carbonate. The prepared non-aqueous electrolyte is charged into the inside of the outer casing member through its open side. The outer casing member is then sealed by thermally bonding the open side of the outer casing member. In this way, the laminate-type secondary cell is completed.

EXAMPLES

The present invention will be described in more detail below by way of the following examples and comparative examples. It is noted that the following examples are only illustrative and not intended to limit the present invention thereto.

Example 1

(Formation of Negative Electrode)

A slurry was prepared by stirring and uniformly dispersing a powder of amorphous carbon-coated natural spherical graphite (average particle size: 20 μm, average aspect ratio: 1.2, BET specific surface area: 1.2 m$^2$/g) as a negative electrode active material, polyvinylidene fluoride as a fluororesin-based binding agent and a first carbon black (average particle size: 1 μm, BET specific surface area: 64 m$^2$/g) as a carbon black-based conductive aid at a solid matter mass ratio of 96.5:3:0.5 in N-methyl-2-pyrrolidone (NMP). A copper foil sheet of 15 μm in thickness was provided as a negative electrode collector. The above-prepared slurry was applied to the copper foil sheet. The applied slurry was dried at 125° C. for 10 minutes to evaporate NMP and thereby form a negative electrode active material layer. The negative electrode active material layer was subjected to pressing. There was thus obtained a negative electrode having the negative electrode active material layer formed on one side thereof. The density of the negative electrode active material layer per unit area after the drying was 0.008 g/cm$^2$.

(Formation of Positive Electrode)

A slurry was prepared by stirring and uniformly dispersing a powder of spinel structure compound $Li_{1.1}Mn_{1.8}Mg_{0.1}O_4$ (average particle size: 10 μm) as a positive electrode active material, polyvinylidene fluoride as a binding agent and a powder of carbon black as a conductive aid at a solid matter mass ratio of 92:4:4 in N-methyl-2-pyrrolidone (NMP). A aluminum foil sheet of 20 μm in thickness was provided as a positive electrode collector. The above-prepared slurry was applied to the aluminum foil sheet. The applied slurry was dried at 125° C. for 10 minutes to evaporate NMP and thereby form a positive electrode active material layer. There was thus obtained a positive electrode having the positive electrode active material layer formed on one side thereof. The density of the positive electrode active material layer per unit area after the drying was 0.025 g/cm$^2$.

(Production of Lithium-ion Secondary Cell)

The above-formed negative and positive electrodes were each cut into a size of 5 cm (width)×6.0 cm (length). Each of the negative and positive electrodes had a non-coated part of 5 cm×1 cm in size on one side thereof for terminal connection. The active material layer was formed with a size of 5 cm×5 cm. An aluminum positive electrode terminal of 5 cm in width, 5 cm in length and 0.1 mm in thickness was provided and joined at a length of 1 cm to the non-coated part of the positive electrode by ultrasonic welding. A nickel negative electrode terminal of the same size as the positive electrode terminal was provided and joined at a length of 1 cm to the non-coated part of the positive electrode by ultrasonic welding. Further, a polyethylene-polypropylene separator of 6 cm×6 cm in size was provided. The negative and positive electrodes were laminated on both sides of the separator such that the active material layers of the negative and positive electrodes overlapped each other via the separator, thereby obtaining an electrode laminate. Two aluminum laminate film sheets of 7 cm×10 cm in size were formed into a bag-shaped laminate outer casing member by thermally bonding three sides except one long side of the aluminum laminate film sheets at a width of 5 mm. The electrode laminate was placed in the laminate outer casing member such that the electrode laminate was situated at a distance of 1 cm from one short side of the laminate outer casing member. Then, 0.203 g of the after-mentioned non-aqueous electrolyte was impregnated under vacuum into the electrolyte laminate. After that, the open side of the laminate outer casing member was sealed by thermal bonding at a width of 5 mm under reduced pressure. With this, a laminate-type secondary cell of the present example was completed.

The non-aqueous electrolyte herein used was prepared by mixing ethylene carbonate (EC) and diethyl carbonate (DEC) at a ratio of EC:DEC=30:70 (volume ratio) and dissolving, in the resulting non-aqueous solvent, lithium hexafluorophosphate ($LiPF_6$) as an electrolyte salt at a concentration of 1.0 mol/L and cyclic disulfonic acid ester as an additive at a concentration of 1.5 mass %.

Example 2

A laminate-type secondary cell of the present example was produced in the same manner as in Example 1 except that, in the formation of the negative electrode, the slurry was prepared by changing the amount of the first carbon black added from 0.5 mass % to 1.0 mass % and stirring and uniformly dispersing the negative electrode active material, the fluororesin-based binding agent and the carbon black-based conductive aid at a solid matter mass ratio of 96:3:1 in NMP.

Example 3

A laminate-type secondary cell of the present example was produced in the same manner as in Example 1 except that, in the formation of the negative electrode, the slurry was prepared by adding a second carbon black (average particle size: 3 μm, BET specific surface area: 20 m$^2$/g) in an amount of 2 mass % to the first carbon black and stirring and uniformly dispersing the negative electrode active material, the fluororesin-based binding agent and the carbon black-based conductive aid at a solid matter mass ratio of 94.5:3:2.5 in NMP.

Example 4

A laminate-type secondary cell of the present example was produced in the same manner as in Example 1 except that, in the formation of the negative electrode, the slurry was prepared by adding a second carbon black (average particle size: 3 μm, BET specific surface area: 20 m$^2$/g) in an amount of 4 mass % to the first carbon black and stirring and uniformly dispersing the negative electrode active material, the fluororesin-based binding agent and the carbon black-based conductive aid at a solid matter mass ratio of 92.5:3:4.5 in NMP.

Example 5

A laminate-type secondary cell of the present example was produced in the same manner as in Example 1 except that, in the formation of the negative electrode, the slurry was prepared by adding a second carbon black (average particle size: 3 μm, BET specific surface area: 20 m$^2$/g) in an amount of 8 mass % to the first carbon black and stirring and uniformly dispersing the negative electrode active material, the fluororesin-based binding agent and the carbon black-based conductive aid at a solid matter mass ratio of 88.5:3:8.5 in NMP.

Example 6

A laminate-type secondary cell of the present example was produced in the same manner as in Example 2 except that, in the formation of the negative electrode, the slurry was prepared by adding a second carbon black (average particle size: 3 μm, BET specific surface area: 20 m$^2$/g) in an amount of 2 mass % to the first carbon black and stirring and uniformly dispersing the negative electrode active material, the fluororesin-based binding agent and the carbon black-based conductive aid at a solid matter mass ratio of 94:3:3 in NMP.

Example 7

A laminate-type secondary cell of the present example was produced in the same manner as in Example 2 except that, in the formation of the negative electrode, the slurry was prepared by adding a second carbon black (average particle size: 3 μm, BET specific surface area: 20 m$^2$/g) in an amount of 4 mass % to the first carbon black and stirring and uniformly dispersing the negative electrode active material, the fluororesin-based binding agent and the carbon black-based conductive aid at a solid matter mass ratio of 92:3:5 in NMP.

Example 8

A laminate-type secondary cell of the present example was produced in the same manner as in Example 2 except that, in the formation of the negative electrode, the slurry was prepared by adding a second carbon black (average particle size: 3 μm, BET specific surface area: 20 m$^2$/g) in an amount of 8 mass % to the first carbon black and stirring and uniformly dispersing the negative electrode active material, the fluororesin-based binding agent and the carbon black-based conductive aid at a solid matter mass ratio of 88:3:9 in NMP.

Example 9

A laminate-type secondary cell of the present example was produced in the same manner as in Example 1 except that, in the formation of the positive electrode, the slurry was prepared by adding a powder of lithium nickel oxide ($LiNi_{0.8}Co_{0.15}Al_{0.05}O_2$) in an amount of 20 mass % to the powder of spinel structure compound $Li_{1.1}Mn_{1.8}Mg_{0.1}O_4$ (average particle size: 10 μm) as the positive electrode active material and stirring and uniformly dispersing the positive electrode active material, the binding agent and the conductive aid at a solid matter mass ratio of 92:4:4 in NMP.

Comparative Example 1

A laminate-type secondary cell of the present comparative example was produced in the same manner as in Example 1 except that, in the formation of the negative electrode, the slurry was prepared by stirring and uniformly dispersing a powder of amorphous carbon-coated natural spherical graphite (average particle size: 20 μm, average aspect ratio: 1.2, BET specific surface area: 1.2 m²/g) as a negative electrode active material and polyvinylidene fluoride as a fluororesin-based binding agent at a solid matter mass ratio of 97:3 in NMP.

Comparative Example 2

A laminate-type secondary cell of the present comparative example was produced in the same manner as in Example 9 except that, in the formation of the negative electrode, the slurry was prepared by stirring and uniformly dispersing a powder of amorphous carbon-coated natural spherical graphite (average particle size: 20 μm, average aspect ratio: 1.2, BET specific surface area: 1.2 m²/g) as a negative electrode active material and polyvinylidene fluoride as a fluororesin-based binding agent at a solid matter mass ratio of 97:3 in NMP.

[Performance Evaluation]

The laminate-type secondary cells of the above examples and comparative examples were tested for their internal resistance increase rate by measuring voltage drops in the laminate-type secondary cells when discharging at a predetermined current value immediately after shipment (i.e. at the initial state) and after 100 cycles of operation, and then, determining direct-current resistance values of the laminate-type secondary cells based on the measurement results. The test results are indicated, together with part of the specifications of the laminate-type secondary cells, in TABLES 1 and 2. Herein, the term "internal resistance increase rate" refers to the ratio of the direct-current resistance value of the battery after 100 cycles of operation to the direct-current resistance value of the battery immediately after shipment (i.e. at the initial state).

TABLE 1

|  | Example | | | | | | | | Comparative Example |
|---|---|---|---|---|---|---|---|---|---|
|  | 1 | 3 | 4 | 5 | 2 | 6 | 7 | 8 | 1 |
| First carbon black | 0.5 | 0.5 | 0.5 | 0.5 | 1.0 | 1.0 | 1.0 | 1.0 | 0 |
| Second carbon black | 0 | 2 | 4 | 8 | 0 | 2 | 4 | 8 | 0 |
| Internal resistance increase rate | 1.20 | 1.18 | 1.16 | 1.18 | 1.14 | 1.12 | 1.10 | 1.12 | 1.30 |

TABLE 2

|  | Example | | Comparative Example |
|---|---|---|---|
|  | 1 | 9 | 2 |
| First carbon black | 0.5 | 0.5 | 0 |
| Second carbon black | 0 | 0 | 0 |
| $Li_{1.1}Mn_{1.8}Mg_{0.1}O_4$ | 92 | 70 | 70 |
| $LiNi_{0.8}Co_{0.15}Al_{0.05}O_2$ | 0 | 22 | 22 |
| Internal resistance increase rate | 1.20 | 1.10 | 1.2 |

In TABLE 1, it has been shown by comparison of Examples 1 to 8 within the scope of the present invention and Comparative Example 1 out of the scope of the present invention that it is not possible to prevent resistance increase in the lithium-ion secondary cell where no carbon black-based conductive aid was contained in the negative electrode as compared to the lithium-ion secondary cell where the positive electrode containing the lithium-manganese composite oxide partially substituted by magnesium as the positive electrode active material was used in combination with the negative electrode containing the amorphous carbon-coated graphite, the carbon black-based conductive aid and the fluororesin-based binding agent. Among others, resistance increase was effectively prevented in the lithium-ion secondary cells of Examples 4 and 7, in particular the lithium-ion secondary cell of Example 7.

It has also shown by comparison of the amount of change between the internal resistance increase rates of Examples 1 and 2 with the amount of change between the internal resistance increase rate of Examples 1 and 3 or of Examples 2 and 6 that the larger the BET specific surface area of the carbon black-based conductive aid, the greater the resistance increase preventing effect. It is apparent that the BET specific surface area of the carbon black-based conductive aid is preferably in the range of 10 to $10^2$ m²/g in terms of the resistance increase preventing effect.

In TABLE 2, it has been shown by comparison of Examples 1 and 9 within the scope of the present invention that it is possible to more effectively prevent resistance increase in the lithium-ion secondary cell by the use of the positive electrode containing the lithium-manganese composite oxide substituted by magnesium in combination with the lithium-nickel composite oxide as the positive electrode active material.

Although the present invention has been described with reference to the above specific embodiments and examples, the present invention is not limited to these specific embodiments and examples. Various modifications and variations of the embodiments and examples described above will occur within the scope of the present invention.

For example, the configurations of the respective examples are not limited to the above. It is feasible to change the details of the configurations of the positive electrode active material, the negative electrode active material, the carbon black-based conductive aid and the fluororesin-based binding agent in the respective examples or provide the respective examples with any other combinations of configurations.

The invention claimed is:

1. A lithium-ion secondary cell, comprising:
   a positive electrode containing a lithium-manganese composite oxide partially substituted by magnesium as a positive electrode active material; and
   a negative electrode containing a graphite coated with amorphous carbon as a negative electrode active material, a carbon black-based conductive aid and a fluororesin-based binding agent,
   wherein the carbon black-based conductive aid has a larger specific surface area than that of the negative electrode active material, and
   wherein the carbon black-based conductive aid includes two kinds of carbon black materials of different specific surface areas, wherein one of the two kinds of carbon black materials having a first specific surface area is present in a larger amount than the other of the two kinds of carbon black materials having a second specific surface area, the second specific surface area being smaller than the first specific surface area.

2. The lithium-ion secondary cell according to claim 1, wherein the carbon black-based conductive aid has a BET specific surface area of 10 to $10^2$ m$^2$/g.

3. The lithium-ion secondary cell according to claim 1, wherein the positive electrode further contains a lithium-nickel composite oxide as a positive electrode active material.

4. The lithium-ion secondary cell according to claim 1, wherein the amount of the other of the two kinds of carbon black materials having the second specific surface area is 2 to 8 mass % of the amount of the one of the two kinds of carbon black materials having the first specific surface area.

5. The lithium-ion secondary cell according to claim 1, wherein the second specific surface area of the other of the two kinds of carbon black materials is 10 to 20 m$^2$/g.

* * * * *